A. RICH.
VEHICLE TIRE.
APPLICATION FILED OCT. 22, 1915.
1,185,714.
Patented June 6, 1916.
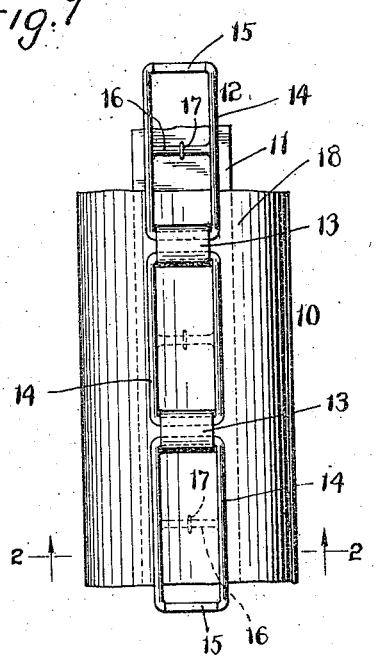
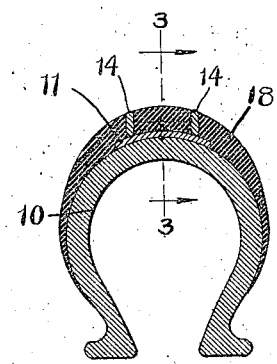
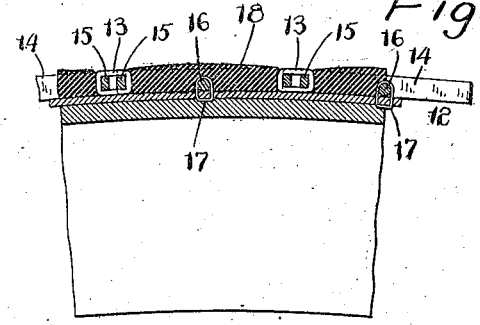
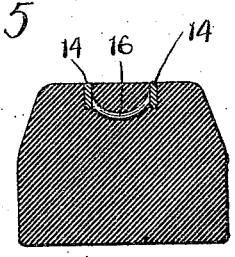
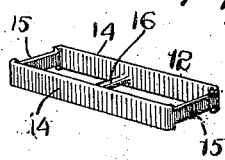
WITNESSES:
INVENTOR
Ambrose Rich
BY
ATTORNEY

UNITED STATES PATENT OFFICE.

AMBROSE RICH, OF STAMFORD, CONNECTICUT.

VEHICLE-TIRE.

1,185,714.  Specification of Letters Patent.  Patented June 6, 1916.

Application filed October 22, 1915. Serial No. 57,266.

*To all whom it may concern:*

Be it known that I, AMBROSE RICH, a citizen of the United States, residing at Stamford, county of Fairfield, State of Connecticut, have invented an Improvement in Vehicle-Tires, of which the following is a specification.

This invention is applicable to both pneumatic and cushion tires and has for its object to provide a tire which shall be simple and inexpensive to produce, long wearing and relatively noiseless.

With this and other objects in view I have devised the novel long wearing tire which I will now describe, referring to the accompanying drawing forming a part of this specification and using reference characters to indicate the several parts.

Figure 1 is an edge view of a portion of a tire embodying my novel invention as applied to a pneumatic tire; Fig. 2 a transverse section on the line 2—2 in Fig. 1; Fig. 3 a longitudinal section on the line 3—3 in Fig. 2; Fig. 4 a perspective view of one of the metallic members detached, and Fig. 5 is a transverse section showing the application of the invention to a cushion tire.

10 denotes the body of a pneumatic tire, which may be built up in the ordinary or any preferred manner, and 11 a non-metallic foundation strip which may be made of any strong and durable waterproof material, such as would be adapted for use in the manufacture of belts. The wearing device of my novel tire consists of a plurality of metallic members 12, which are flexibly connected together by flattened metallic sleeves 13. These metallic members may be cast, forged or formed from sheet metal, as preferred. They are rectangular in form and of appreciably greater width than thickness.

14 denotes the sides of the metallic members, 15 the ends, and 16 central cross pieces. The ends of the metallic members are made enough narrower than the sides, see Fig. 4, so that the sleeves which inclose the ends of contiguous members will not project above the tops of the members. This is in order that the wear in use will come almost entirely upon the members instead of upon the sleeves. In building a pneumatic tire, a sufficient number of metallic members connected together by sleeves to inclose the body are secured to the foundation strip in any suitable manner, as by staples 17 passing about the cross pieces and through the foundation strip and clenched on the under side thereof. The foundation strip is then laid centrally upon the body, and a finishing ply 18 of plastic material is molded upon the body and incloses the foundation strip and all of the metallic members and the sleeves, except the outer edges of the metallic members and the tops of the sleeves.

In Fig. 5, I have illustrated the application of the invention to a cushion tire. The metallic members are as before. It is not necessary, however, that a foundation strip be used as the metallic members and sleeves may be molded into the tire itself, as clearly shown in Fig. 5. The cross piece 16 is shown as bent downward in order to go more deeply into the rubber of the tire. This, however, is a mere detail of construction and does not go to the merits of the invention.

Having thus described my invention, I claim:—

1. A non-skid tire comprising a body, a foundation strip surrounding the body, flexibly connected link-like wearing members provided with transverse anchor members intermediate of the ends thereof, means for attaching said anchor members to said foundation strip, and a tread portion attached to said body and inclosing said wearing strip, said wearing members being embedded within said tread portion.

2. A non-skid tire comprising a body provided with a tread portion, and flexibly connected link-like wearing members substantially rectangular in cross section having flat side members, and rounded anchor members intermediate of the ends thereof, said wearing members being embedded in the tread portion with the outer edges of their flat side members exposed, said anchor members being of a diameter less than the height of said wearing members and completely buried within the tread portion.

In testimony whereof I affix my signature.

AMBROSE RICH.